United States Patent [19]
Ray et al.

[11] 3,935,018
[45] Jan. 27, 1976

[54] GLASSES

[75] Inventors: Neil Hunter Ray; William Derek Robinson, both of Runcorn, England

[73] Assignee: Imperial Chemical Industries Limited, London, England

[22] Filed: Apr. 12, 1973

[21] Appl. No.: 350,496

[30] Foreign Application Priority Data
Apr. 27, 1972 United Kingdom............... 19560/72
Aug. 16, 1972 United Kingdom............... 38141/72

[52] U.S. Cl............................. 106/47 R; 106/47 Q
[51] Int. Cl.²........................................... C03C 3/00
[58] Field of Search....................... 106/47 Q, 47 R

[56] References Cited
UNITED STATES PATENTS

| | | | |
|---|---|---|---|
| 2,684,304 | 7/1954 | Weissenberg et al............ | 106/47 Q |
| 2,920,972 | 1/1960 | Godron............................ | 106/47 R |
| 2,996,390 | 8/1961 | Weissenberg et al............ | 106/47 Q |
| 2,996,391 | 8/1961 | Weissenberg et al............ | 106/47 Q |
| 3,253,934 | /1966 | Godron............................ | 106/47 |
| 3,499,774 | 3/1970 | Weyl................................ | 106/47 R |

OTHER PUBLICATIONS

Rawson, H., Inorganic Glass–Forming Systems, (1967), Academic Press, NYC, pp. 172–173.
Takahashi, K., Advances in Glass Technology, (1962), Plenum Press, NYC, pp. 366–376.

*Primary Examiner*—Winston A. Douglas
*Assistant Examiner*—John F. Niebling
*Attorney, Agent, or Firm*—Cushman, Darby & Cushman

[57] ABSTRACT

Inorganic oxide glasses having compositions within the range (in moles percent) $B_2O_3$ 1.2–3.5, $P_2O_5$ 50–72, PbO 0–30, transition metal oxides 0–5, the remainder being oxides selected from alkali metal oxides, alkaline earths and zinc oxide.

16 Claims, No Drawings

GLASSES

This invention relates to inorganic oxide glass compositions. Our copending British Patent Application No. 48105/71 discloses certain borophosphate glasses, that is, glasses having a network structure comprising a random mixture of boric and phosphoric oxides. The glass disclosed in that application also comprise minor proportions of the oxides of one or more alkali metals, alkaline earth metals, and/or zinc and have compositions within the following range (mole %)

$P_2O_5 + B_2O_3$ 72.5–77.5
oxides selected from alkali metal oxides, alkaline earths and zinc oxide 22.5–27.5.

The ratio of $P_2O_5 : B_2O_3$ is from 15:1 to 6:1, so that the minimum $B_2O_3$ content is 1/16 of 72.5% or 4.5%.

We have now found that there are advantages, discussed below, in reducing the proportion of boric oxide in borophosphate glasses to a level significantly lower than that present in the above compositions.

The present invention therefore provides inorganic oxide glasses having compositions within the following range (moles %)

$B_2O_3$ 1.2–3.5
$P_2O_5$ 50–72
PbO 0–30
transition metal oxides 0–5
the remainder being oxides selected from alkali metal oxides, alkaline earths and zinc oxide.

Water is excluded from the compositions set out above; it may be present in amounts up to 5% by weight of the glass. Trace quantities (up to approximately 1%, but preferably not more than 0.5%) of other oxides, for example alumina and silica, may also be present.

Within the above range certain narrower ranges of glass compositions are preferred, as follows: (proportions in moles %)

Group A
$B_2O_3$ 1.2–3.5
$P_2O_5$ 68–72
the remainder being oxides selected from alkali metal oxides, alkaline earths and zinc oxide.

Group B
$B_2O_3$ 1.2–3.5
$P_2O_5$ 50–58
PbO 10–30
transition metal oxides 0–5
the remainder being oxides selected from alkali metal oxides, alkaline earths and zinc oxide.

Group C
$B_2O_3$ 1.2–3.5
$P_2O_5$ 52–66, preferably 55–66
PbO less than 10
transition metal oxides 0–5
the remainder being oxides selected from alkali metal oxides, alkaline earths and zinc oxide.

Group D
$B_2O_3$ 1.2–3.5
$P_2O_5$ 64–68
PbO 10–16
transition metal oxides 0–5
the remainder being oxides selected from alkali metal oxides, alkaline earths and zinc oxide.

The term 'transition metal oxides' is used to signify oxides of metals in Groups IIIa, IVa, Va, VIa, VIIa, VIII and Ib of the Periodic Table (as given inside the back cover of "Advanced Inorganic Chemistry" by F. A. Cotton & G. Wilkinson, 2nd Edition, 1966, Interscience Publishers), together with oxides of metals of the lanthanide and actinide series.

The term 'alkali metal oxides' means oxides of lithium, sodium, potassium, rubidium and caesium, and the term 'alkaline earths' means BeO, MgO, CaO, SrO and BaO.

It is found that on reducing the boric oxide content of borophosphate glasses to the levels disclosed herein, there is considerably less tendency for crystalline inclusions to form in the glasses during the manufacturing process. Such crystals, believed to consist essentially of boron phosphate, $BPO_4$, when present in small quantities cause the glass to have a white translucent appearance, and when present in larger quantities may adversely affect the durability and mechanical properties of the glass. Surprisingly, the good durability associated with borophosphate glasses, is not lost when the boric oxide content is reduced to the range of 1.2–3.5 mole %, and the resulting glasses, particularly those having compositions within Group A, have lower melt viscosities and may be capable for example of being injection moulded on commercially available plastics processing equipment.

The proportions of the various alkali metal oxides, alkaline earths and zinc oxide may be varied within wide limits, with consequent variation in the properties of the resulting glass. Both transformation temperature ($T_g$) and durability are increased by the replacement of alkali metal oxide with alkaline earth, the magnitude of the effect generally increasing in the series SrO, BaO, CaO, MgO. The replacement of alkali metal oxide with zinc oxide at high concentrations may also increase transformation temperature and durability.

In order to obtain useful control over the properties of the resulting glasses, it is preferred that the glass compositions contain at least two metal oxides in addition to $P_2O_5$ and $B_2O_3$. More preferably they contain at least one alkali metal oxide together with at least one oxide selected from alkaline earths and zinc oxide. Glasses containing $K_2O$ tend to have lower durabilities than similar glasses containing $Na_2O$ or $Li_2O$, and $Na_2O$ and $Li_2O$ are accordingly the preferred alkali metal oxides.

The formation of crystalline inclusions in the preparation of glasses according to the invention, particularly in large-scale manufacture, is made less likely if the composition comprises at least 14 moles % of alkali metal oxides. Furthermore, magnesium oxide may give rise to glasses containing a crystalline phase if present in quantities greater than 12.5 mole %, and preferably glasses according to the invention comprise not more than 12.5 mole % MgO.

Up to 5 moles % of transition metal oxides may be present in glasses according to the invention, and these oxides may be used to produce a coloured glass. For example, the addition of tungsten oxide may give glasses ranging in colour from pale amber to deep blue according to the oxidation state of the tungsten, and that of chromium oxide gives olive green glasses.

The proportion of lead oxide in the glass may be varied within the range stated for the purpose of controlling the refractive index of the glass, which may then be fabricated into optical articles for example lenses, prisms, mirrors and windows.

Thus glasses having compositions within Group C above, but with PbO contents of less than 1% tend to have refractive indices in the range 1.50 to 1.51, whereas those having 4-6 mole % PbO, and preferably 58-65 mole % $P_2O_5$, 12-20 mole % $Na_2O$, may have refractive indices in the range 1.51-1.53. Certain glass compositions within this range may be made to conform to the specification for white opthalmic crown glass in British Standard B.S. 3062 (1959), which specifies a refractive index of 1.523 ± 0.001. Preferably in such compositions, the balance of the composition other than the stated proportions of $B_2O_3$, $P_2O_5$, PbO and NaO is made up of CaO, MgO and $Li_2O$.

Glasses having compositions within Group D above may have refractive indices close to or matching that of E-glass (1.548), and are suitable for incorporation with E-glass into transparent glass-reinforced polyester sheeting.

Certain glasses according to the present invention possess the useful property of having non-misting surfaces, as described in our copending British Patent Applications Nos. 30503/72 & 8489/73. The glasses may also be suitable for coprocessing with organic polymers in composites as described in our copending British Patent Application No. 18481/70 and with inorganic components as described in our copending British Patent Application No. 48103/71. They may also be coprocessed with pigments, opacifiers and the like, and may be suitable for melt spinning into fibres. Glasses having compositions within Group B above may be particularly suitable for the preparation of fibres.

The glasses may be prepared by heating together the appropriate oxides, or their precursors. By 'precursor' is meant a compound which on heating will react with the other components present to give the same chemical composition in the product as if the oxide had been used. Usually this reaction will occur with evolution of one or more volatile compounds, for example water, carbon dioxide and ammonia. Thus suitable precursors of phosphoric oxide include phosphoric acid and ammonium phosphates, while carbonates may be used as precursors of metal oxides. Mixtures of an oxide and a precursor of that oxide, or of two or more precursors of the same oxide may be used, and the same compound may be used as a precursor of more than one oxide, thus for example potassium phosphate is a precursor of $K_2O$ and of $P_2O_5$, and borax (sodium borate) is a precursor of $B_2O_3$ and of $Na_2O$. Sodium nitrate may be used as a precursor of $Na_2O$ when oxidising conditions are required in the melt, for example to ensure that a transition metal oxide is present in its highest oxidation state.

The heating may be carried out in a two-stage process, in which some or all of the components are first heated together at a relatively low temperature, for example 300°-500°C, to give a glassy mixture (conveniently referred to as the premelt), which is then refined at a higher temperature, for example 500°-800°C. The duration of the first stage of the heating process to form the premelt, is generally from 1-8 hr. When preparing a 2kg bath, a time of 2½ to 4½ hours is convenient. If less than all of the components are present at the initial heating stage the remaining material may be added subsequently before or during the refining stage. This method is convenient for small scale laboratory preparations, but alternatively the components may be mixed together and heated for example to 500°-800°C in a single stage operation. For example, the components may be mixed together at room temperature, with $P_2O_5$ supplied in the form of 88% phosphoric acid, and alkali metal oxides as carbonates. The heat of reaction will cause the temperature to rise to approx. 100°C, and this temperature is maintained by heating until gas evolution ceases. The mixture is then gradually added to a crucible maintained at a temperature between 500° and 800°C. Preferably the temperature is initially between 500° and 700°C, and when all the mixture has been added it is raised to 700°-800°C for a further period.

The addition of the components may be made all at once or sequentially in a batch process, but it may be desirable, particularly when operating upon a large scale, to form the glass in a continuous process in which the mixture of components is continually or periodically being added to, and glass removed from, a reaction vessel maintained at the refining temperature.

We have found, however, that in the preparation of ultraphosphate glasses, (that is, those in which the number of moles of $P_2O_5$ is more than double the number of moles of alkaline metal oxides), by the two-stage process involving an intermediate premelt, the addition of all of the $P_2O_5$ in the form of phosphoric acid may lead to the formation of an intractable crystalline phase at the premelt stage. This problem may be overcome by reducing the unneutralised $P_2O_5$ content of the melt by supplying at least part of the $P_2O_5$ in the form of an ammonium phosphate, for example ammonium dihydrogen phosphate. Thus in 100 moles of a glass having the composition (moles %) $P_2O_5$ 72, metal oxides 25, $B_2O_3$ 3, the excess unneutralised $P_2O_5$ is 72−25 = 47 moles. It is found that not more than 61 moles of the $P_2O_5$ may be added as acid if the formation of a crystalline premelt is to be avoided, if the other 11 moles is added as ammonium dihydrogen phosphate. The excess unneutralised $P_2O_5$ is thereby reduced to 36 moles, or half of the total $P_2O_5$ content, and we find that in general, if the excess unneutralised $P_2O_5$ content does not exceed half the total $P_2O_5$ content, a crystal-free premelt will be formed. If part of the $P_2O_5$ is added in the form of a more fully neutralised precursor such as diammonium hydrogen phosphate, correspondingly more $P_2O_5$ may be added as phosphoric acid.

During refining water is gradually lost, the glass network becomes more highly crosslinked, and the viscosity and transformation temperature (Tg) of the glass increase. Small amounts of volatile oxide components, for example $P_2O_5$, may be lost during the refining stage, and it is desirable to keep the temperature below 800°C. when refining glasses according to the invention, to minimise any such loss, As mentioned above, the residual water in glasses according to the invention may represent up to 5% by weight of the total, but is not included in the compositions set out above, which may be regarded as nominal molar compositions in that they are based upon the composition of the initial mixture of components.

A glass of a given composition may have a range of transformation temperatures, depending upon the refining conditions, and a glass having any desired transformation temperature within this range may be obtained by routine experimentation involving selection of the appropriate conditions, for example time, temperature and batch size, in the refining step. The length of refining time required for a particular glass composition to reach a particular transformation temperature cannot be specified, as it depends upon the size of the batch, the type of furnace and crucible used, the exact temperature of the furnace, the furnace atmosphere and other variables. In general, the refining time may vary from 1 hour to 1 week, depending upon the desired transformation temperature and the variables listed above. However, if a given glass composition is refined until it reaches a given transformation temperature, which may be determined simply by differential thermal analysis of a cooled sample of the glass, properties such as durability will be reproducible from one batch of that composition to another. In general, the durability of a given glass composition increases with its transformation temperature.

The durability of the glasses is a function of the rate at which they are attacked by water, which may be expressed either as the rate of loss of weight of a standard sample expressed in units of %/min at a given temperature, or as the rate of erosion of a glass surface expressed in units of microns/min. at a given temperature, and in the present application both measurements are used, the relevant units being indicated in each case. A low rate of attack by water (Rw) corresponds to a high durability and vice versa.

The rate of loss of weight at 100°C is determined by the following procedure: Approximately 2g of molten glass is poured on to a steel plate and allowed to cool. The resulting smooth disc of glass, approximately 2 cm in diameter and 0.3 cm thick, is weighed, immersed in boiling water for 1 hour, dried and reweighed. The weight loss divided by the initial weight and multiplied by 100/60 gives the percentage weight loss/minute.

For glasses having good durability an alternative test method, whereby the rate of erosion of the surface at 20°C or 100°C is measured, gives more accurate results. According to this procedure, the glass is ground and sieved to provide approximately 10g of glass powder of particle size 300–500$\mu$m (30–52 mesh BS410). Approximately 5g of the powdered glass ia added to a weighed sintered glass crucible having a No. 3 sinter, that is, a sinter having an average pore diameter of 20–30$\mu$m. The contents of the crucible are washed with distilled water then with acetone and dried under a vacuum of less than 1 mm Hg air pressure at room temperature for 30 minutes.

The crucible and its contents are then weighed accurately to determine the initial weight of the glass. A constant-head device is then arranged to maintain a level of 3 cm of distilled water at 20°C in the crucible, which ensures that water flows through the sinter at a rate of approximately 4 ml/min. Alternatively the crucible is placed in a steam jacket which maintains the contents at 100°C, and water at 100°C is supplied so as to drip through the crucible at the rate of 4 ml/min.

After 24 hours the crucible and its contents are washed with acetone, dried in vacuum as described above and reweighed to determine the final weight of the glass. The rate of erosion is calculated from the equation $$X = 0.28 \left[ 1 - \left(\frac{W_2}{W_1}\right)^{1/3} \right]$$

where,
$X$ = rate of erosion ($\mu$/min)
$W_1$ = initial weight of glass (g)
$W_2$ = final weight of glass (g)

The mean of two determinations is taken. As a rough indication of the correlation between the two methods, a weight loss at 100° of 0.01%/min corresponds approximately to a rate of surface erosion at 20°C of 2 × $10^{-4}\mu$/min, and at 100°C of 0.3$\mu$/min.

The transformation temperature of the glass is determined by differential calorimetry using the Du Pont Differential Thermal Analyser. A sample of the powdered glass and a reference sample of pure powdered silica are heated at a programmed rate of temperature increase of 20°C/min, and a graph is obtained of the temperature difference between the samples plotted against the temperature of the reference sample. This curve typically has a linear portion of small slope and a second linear portion of larger negative slope at higher temperatures. The two linear portions are produced so that they intersect, and the transformation temperature is taken as the temperature corresponding to the point of intersection.

Preferably glasses according to the invention have transformation temperature not greater than 300°C. Preferably also the rate of attack by water (Rw) on the glasses at 100°C is not greater than 1%/min although for glasses of Tg between 200° and 300°C, Rw will normally be considerably less than this value.

Our copending U.S. pat. application Ser. No. 329,167 filed Feb. 2, 1973, inorganic oxide glasses having compositions within the range (in mole %)

$P_2O_5$ 50–75

Group VIa oxides 0.1–10, comprising singly or in combination $CrO_3$ up to 2.6, $MoO_3$ up to 7, $WO_3$ up to 7.

At least one oxide selected from alkali metal oxides and alkaline earths 15–49.9, the total of all the above components being at least 98 moles % of the total composition, excluding water, and states that other oxides, including $B_2O_3$, may be present up to about 2 moles % of the composition. The present application does not claim any glass compositions claimed in U.S. Pat. application Ser. No. 329,167 filed Feb. 2, 1973.

The invention is illustrated by the following Examples, of which Examples 1–3 illustrate glasses according to the invention falling within Group A, Examples 4–6 illustrate glasses according to the invention falling within Group B, Examples 7–22 illustrate glasses according to the invention falling with Group C, and Example 23 illustrates a glass within Group D.

EXAMPLE 1

950g of glass was prepared in a two stage process as follows:

a. a premelt was prepared having the nominal composition $P_2O_5$, 71.8; $B_2O_3$, 2.56; $Li_2O$, 10.26; $Na_2O$, 10.26; $BaO$, 5.13 moles % by stirring together 1365g ammonium dihydrogen phosphate, 14.8g boric oxide, 62.6g lithium carbonate, 89.9g sodium carbonate and 65g barium oxide and heating the mixture at 300°C for 3 hours until a clear viscous melt was formed. The mixture was cooled to a solid premelt which was broken into pieces.

b. The premelt was heated for 10 hours in an alumina crucible to 700°C in a furnace through which a controlled stream of air was passed. The molten glass was poured in a thin stream into a large quantity of cold water, giving a coarsely granulated glass having the following properties:

| | |
|---|---|
| Transformation temperature (Tg) | 152°C |
| Rate of attack by water (Rw) | 1$\mu$m/min at 100°C |

| | |
|---|---|
| Density | 2.42 g cm$^{-3}$ |
| Young's Modulus | 28 GNm$^{-2}$ |
| Viscosity | 10$^3$ Nsm$^{-2}$ at 384°C |
| | 10$^4$ Nsm$^{-2}$ at 310°C |
| | 10$^5$ Nsm$^{-2}$ at 264°C |

Granules of the glass of 5–8 mesh size were fed into a Stubbe injection moulding machine and mouldings of flat discs 10 cm diameter and 0.3 cm thick were produced at a barrel temperature of 330°C and a mould temperature of 100°C.

A premelt of the same nominal composition was prepared by stirring together 779g 88% $H_3PO_4$, 805g $NH_4H_2PO_4$, 17.5g $B_2O_3$, 74.1g $Li_2CO_3$, 106g $Na_2CO_3$ and 76.5g BaO and heating at 350°C for 2 hours then 400°–450°C for 2 hours.

The premelt was refined at 700° to give a transformation temperature of 162°C an Rw value of 0.09%/min at 100°C.

EXAMPLES 2,3

The effect of substituting calcium oxide and magnesium oxide for barium oxide in the composition of Example 1 is shown in Table I.

TABLE I

| Example No. | Composition (Moles %) | | | | | | Tg(°C) | Rw at 100°C (%/min) |
|---|---|---|---|---|---|---|---|---|
| | $P_2O_5$ | $B_2O_3$ | $Li_2O$ | $Na_2O$ | CaO | MgO | | |
| 2 | 71.8 | 2.56 | 10.26 | 10.26 | 5.13 | — | 140 | 0.3 |
| | | | | | | | 155 | 0.02 |
| 3 | 71.8 | 2.56 | 10.26 | 10.26 | — | 5.13 | 130 | 0.03 |
| | | | | | | | 145 | 0.006 |
| | | | | | | | 157 | 0.009 |

EXAMPLE 4

A glass was prepared having the following composition:

| Mole % | Batch wts. |
|---|---|
| 55.9 $P_2O_5$ | 883g $NH_4H_2PO_4$ |
| 2.4 $B_2O_3$ | 11.5g $B_2O_3$ |
| 20.6 PbO | 316g PbO |
| 18.7 $K_2O$ | 178g $K_2CO_3$ |
| 2.4 MgO | 6.6g MgO |

The components of the batch were stirred together and heated for 2 hours at 300°C, then the premelt was refined ½ hour at 700°C.

Tg 206°
Rw 1.3μm/min at 100°C
10$^{-4}$ μm/min at 20°C

| Viscosity (Nsm$^{-2}$) | at Temperature (°C) |
|---|---|
| 2.10$^5$ | 290 |
| 1.6.10$^4$ | 320 |
| 2.5.10$^3$ | 350 |
| 6.10$^2$ | 380 |
| Coefficient of thermal expansion | 18.10$^{-6}$ |
| Youngs' Modulus | 28 GNm$^{-2}$ |
| Tensile strength of typical fibres | 520 MNm$^{-2}$ |

EXAMPLE 5

| Mole % | Batch Weights |
|---|---|
| 55.9 $P_2O_5$ | 1750g 88% $H_3PO_4$ |
| 2.4 $B_2O_3$ | 23.6g $B_2O_3$ |
| 20.6 PbO | 648g PbO |
| 18.7 $K_2O$ | 363g $K_2CO_3$ |
| 1.2 MgO | 6.8g MgO |
| 1.2 BaO | 26.1g BaO |

Stirred and heated at 350°–500°C for 6 hours, then refined at 700°C gave a clear glass of Tg 205°C, Rw 0.028%/min at 100°C.

For purposes of comparison, the same batch weights of components were taken, but the $B_2O_3$ weight was doubled to 47.2g, giving a nominal composition of $P_2O_5$ 54.5, $B_2O_3$ 4.7, PbO 20.1, $K_2O$ 18.3, MgO 1.2, BaO 1.2 moles %, that is, having a $B_2O_3$ content outside the range of the present invention. The batch, stirred and heated at 350°–500°C for 6 hours and refined at 700°C gave a white cloudy glass containing crystalline inclusions.

EXAMPLE 6

Glasses containing transition metal oxides in addition to lead oxide are illustrated in Table 2.

TABLE 2

| Example No. | Composition (Moles %) | | | | | | | | Tg (°C) | Rw at 100°C (%/min) |
|---|---|---|---|---|---|---|---|---|---|---|
| | $P_2O_5$ | $B_2O_3$ | PbO | $Na_2O$ | $K_2O$ | $Li_2O$ | MgO | $WO_3$ | | |
| 5 | 52 | 2 | 20 | 14 | — | 8 | — | 4 | 154 | 0.88 |
| | | | | | | | | | 269 | 0.011 |
| 6 | 52 | 2.8 | 20 | 7.4 | 9 | 4 | 2 | 2.8 | 212 | 0.016 |

The glasses were made by premelting followed by refining at 700°C, and were blue in colour.

EXAMPLES 7–12

These examples illustrate glasses having no lead oxide, most of which fall within Group C, and which have refractive indices in the range 1.50 to 1.51. Their compositions are given in Table 3, and their properties when prepared by premelting and refining at 700°–750°C are given in Table 4.

TABLE 3

| Example No. | Compositions in Mole % | | | | | | | |
|---|---|---|---|---|---|---|---|---|
| | P$_2$O$_5$ | B$_2$O$_3$ | Na$_2$O | Li$_2$O | MgO | CaO | BaO | SrO |
| 7 | 68.3 | 2.4 | 14.6 | 4.9 | 4.9 | 4.9 | — | — |
| 8 | 65.1 | 2.3 | 18.6 | 2.3 | 4.7 | 7.0 | — | — |
| 9 | 64.5 | 2.3 | 13.8 | 4.6 | 4.6 | 4.6 | — | 5.5 |
| 10 | 64.5 | 2.3 | 13.8 | 4.6 | 4.6 | 4.6 | 5.5 | — |
| 11 | 60.5 | 2.3 | 18.6 | 9.3 | 4.7 | 4.7 | — | — |
| 12 | 63.5 | 2.4 | 19.5 | 4.9 | 4.9 | 4.9 | — | — |

TABLE 4

| Example No. | Tg(°C) | Rw at 100°C (%/min) | refractive index | Viscosity (Nsm$^{-2}$) | at Temp. (°C) |
|---|---|---|---|---|---|
| 7 | 160 | 0.01 | 1.502 | — | — |
|   | 168 | 0.008 | — | 2.10$^5$ | 282 |
|   |     |       |    | 1.6.10$^4$ | 325 |
|   |     |       |    | 2.5.10$^3$ | 372 |
|   |     |       |    | 9.10$^2$ | 406 |
| 8 | 162 | 0.05 |   | 2.10$^5$ | 256 |
|   |     |      |   | 1.6.10$^4$ | 298 |
|   |     |      |   | 2.5.10$^3$ | 335 |
|   |     |      |   | 3.10$^2$ | 405 |
|   | 177 | 0.006 | 1.501 | | |
|   | 194 | 0.004 | | | |
| 9 | 188 | 0.003 | 1.508 | | |
| 10 | 202 | 0.002 | 1.508 | | |
| 11 | Not measured | | | | |
| 12 | 169 | 0.005 | 1.500 | 2.10$^5$ | 269 |
|   |     |       |       | 1.6.10$^4$ | 306 |
|   |     |       |       | 2.5.10$^3$ | 347 |
|   |     |       |       | 6.10$^2$ | 387 |
|   | 181 | 0.002 | | | |

EXAMPLES 13–21

These examples illustrate glasses having up to 10 mole % lead oxide, and falling within Group C. When prepared by premelting followed by refining at 700°–750°C, they have refractive indices in the range 1.520 to 1.545. Those of Examples 13–19 have refractive indices close to that of white opthalmic crown glass (1.523) whereas those of Examples 20 and 21 have somewhat higher refractive indices. Compositions are shown in Table 5 and properties in Table 6. These glasses may be useful for fabrication into non-misting optical articles, for example lenses.

TABLE 5

| Example No. | Composition (Moles %) | | | | | | |
|---|---|---|---|---|---|---|---|
| | P$_2$O$_5$ | B$_2$O$_3$ | Na$_2$O | Li$_2$O | CaO | MgO | PbO |
| 13 | 59.9 | 2.3 | 18.4 | 4.6 | 4.6 | 4.6 | 5.5 |
| 14 | 60.5 | 2.3 | 18.6 | 4.7 | 4.7 | 4.7 | 4.7 |
| 15 | 63.0 | 2.25 | 13.5 | 7.65 | 4.5 | 4.5 | 4.6 |
| 16 | 64.5 | 2.3 | 13.8 | 4.7 | 4.6 | 4.6 | 5.5 |
| 17 | 62.8 | 2.2 | 13.5 | 7.6 | 4.5 | 4.5 | 4.9 |
| 18 | 60.4 | 2.1 | 18.6 | 4.6 | 4.6 | 4.6 | 5.1 |
| 19 | 60.1 | 2.1 | 18.5 | 4.6 | 4.6 | 4.6 | 5.4 |
| 20 | 64.1 | 2.4 | 13.7 | 4.6 | 4.6 | 4.6 | 6.1 |
| 21 | 57.8 | 2.2 | 17.8 | 4.4 | 4.4 | 4.4 | 8.9 |

TABLE 6

| Example No. | Tg°C | Rw at 100°C (%/min) | Refractive Index |
|---|---|---|---|
| 13 | 230 | 0.0027 | 1.524 |
|    | 179 | 0.0065 | 1.522 |
| 14 | 212 | 0.003 | 1.518 |
| 15 | 230 | 0.002 | 1.523 |
| 16 | 190 | 0.003 | 1.524 |
| 17 | 230 | 0.002 | 1.525 |
| 18 | 205 | 0.003 | 1.524 |
| 19 | 211 | 0.004 | 1.526 |
| 20 | 195 | 0.003 | 1.528 |
| 21 | 204 | 0.0019 | 1.540 |

EXAMPLE 22

This Example illustrates the preparation of a glass having the composition of Example 15 by a process which does not involve the intermediate formation of a premelt.

Lithium carbonate (62.7g), sodium carbonate (159g) and calcium carbonate (50g) were slowly added with stirring to 88% phosphoric acid (1560g) in a tall borosilicate glass beaker. When gas evolution had ceased, magnesium oxide (20.5g), boric oxide (17.5g) and litharge (114.7g) were rapidly added. The temperature of the mixture rose to approximately 100°C, and the beaker was placed in an oven maintained at 100°C, the contents being stirred continuously.

An alumina crucible was heated to 650°C in a furnace, and the mixture was added slowly to the crucible via a funnel projecting through the roof of the furnace. Addition was complete in 3 hours. After a further 30 minutes, the furnace temperature was increased by 15°C, and a similar temperature increment was made at half hour intervals until the temperature reached 740°C. The crucible was maintained at this temperature for 16 hours, and the molten glass was then cast into a block.

The product glass had the properties given for Example 15 in Table 6.

EXAMPLE 23

This example illustrates a glass composition falling within Group D, and having a refractive index close to that of E-glass. A glass having the composition (moles %) $P_2O_5$ 65.8, $B_2O_3$ 2.3, PbO 13.2, $Na_2O$ 9.4, $Li_2O$ 9.4, prepared by premelting followed by refining at 750°C had a Tg of 155°C and a refractive index of 1.546.

What we claim is:

1. An inorganic oxide glass having a mole % composition in the range
   $B_2O_3$ 1.2 to 3.5;
   $P_2O_5$ 50 to 72;
   PbO 0 to 30;
   at least one oxide selected from oxides of:
   Cu, Ag, Au, Sc, Y, La, Ti, Zr, Hf, V, Nb, Ta, Cr, Mo, W, Mn, Tc, Re, Fe, Co, Ni, Ru, Rh, Pd, Os, Ir, Pt, Ce, Pr, Nd, Sm, Eu, Gd, Tb, Dy, Ho, Er, Tm, Yb, Lu, Th, Pd, and U, 0 to 5;
   the glass containing in addition at least one oxide selected from alkali metal oxides and at least one oxide selected from alkaline earth metal oxides and zinc oxide.

2. An inorganic oxide glass as claimed in claim 1 which contains PbO in a range of 10 to 30 mole %.

3. An inorganic oxide glass as claimed in claim 1 having a mole % composition in the range:
   $B_2O_3$ 1.2 to 3.5;
   $P_2O_5$ 68 to 72;
   the glass containing in addition at least one oxide selected from alkali metal oxides and at least one oxide selected from alkaline earth metal oxides and zinc oxide.

4. An inorganic oxide glass as claimed in claim 2 in which the $P_2O_5$ content lies in the range 50 to 58 mole %.

5. An inorganic oxide glass as claimed in claim 1 which contains $P_2O_5$ in a proportion of 52 to 66 mole % and PbO in a proportion of less than 10 mole %.

6. An inorganic oxide glass as claimed in claim 5 which contains $P_2O_5$ in a proportion of 55 to 66 mole %.

7. An inorganic oxide glass as claimed in claim 1 which contains $P_2O_5$ in a proportion of 64 to 68 mole % and PbO in a proportion of 10 to 16 mole %.

8. An inorganic oxide glass as claimed in claim 1 which contains at least 2 mole % of oxide selected from alkaline earth metal oxides and zinc oxide.

9. An inorganic oxide glass as claimed in claim 8 which contains at least 14 mole % of oxide selected from alkali metal oxides.

10. An inorganic oxide as claimed in claim 8 which contains not more than 12.5 mole % of magnesium oxide.

11. Inorganic oxide glass as claimed in claim 6, comprising not more than 1 mole % of lead oxide.

12. Inorganic oxide glass as claimed in claim 6, comprising from 4 to 6 mole % of lead oxide.

13. Inorganic oxide glass as claimed in claim 12, comprising from 58 to 65 mole % $P_2O_5$ and from 12–20 mole % $Na_2O$.

14. Inorganic oxide glass as claimed in claim 13 having compositions within the range
    $B_2O_3$ 1.2–3.5
    $P_2O_5$ 58–65
    PbO 4–6
    $Na_2O$ 12–20
    The remainder being oxides selected from CaO, MgO and $Li_2O$.

15. An inorganic oxide glass as claimed in claim 14 having the following composition
    $B_2O_3$ 2.25
    $P_2O_5$ 63.0
    PbO 4.6
    $Na_2O$ 13.5
    CaO 4.5
    MgO 4.5
    $Li_2O$ 7.65.

16. Inorganic oxide glass as claimed in claim 1 having transformation temperatures not greater than 300°C and rates of attack by water not greater than 1.0%/min at 100°C.

* * * * *